US006308969B1

United States Patent
Young

(10) Patent No.: US 6,308,969 B1
(45) Date of Patent: Oct. 30, 2001

(54) PANEL DEVICE

(76) Inventor: Roland O. Young, 5900 E. Lake Dr., Grand Forks, ND (US) 58201

( * ) Notice: Subject to any disclaimer, the term of this patent is extended or adjusted under 35 U.S.C. 154(b) by 0 days.

(21) Appl. No.: 09/358,127

(22) Filed: Jul. 20, 1999

(51) Int. Cl.$^7$ .................................................... B62B 1/06
(52) U.S. Cl. ..................... 280/79.7; 280/47.33; 280/63; 280/763.1; 414/11
(58) Field of Search ................... 280/79.7, 47.17, 280/47.131, 47.2, 63, 763.1, 766.1, 47.27, 47.33; 414/10, 11, 445; 188/5

(56) References Cited

U.S. PATENT DOCUMENTS

| | | | |
|---|---|---|---|
| 897,853 | * | 9/1908 | Scheidt .................................. 410/51 |
| 2,624,472 | * | 1/1953 | Cody et al. ......................... 280/47.17 |
| 2,817,538 | * | 12/1957 | Romang ............................. 280/47.26 |
| 4,488,733 | * | 12/1984 | Hellsten ............................. 280/47.16 |
| 5,318,316 | * | 6/1994 | Shurtleff .............................. 280/79.7 |
| 5,820,145 | * | 10/1998 | Osowski .............................. 280/79.7 |

* cited by examiner

Primary Examiner—J. J. Swann
Assistant Examiner—David R. Dunn
(74) Attorney, Agent, or Firm—Robert E. Kleve

(57) ABSTRACT

The invention comprises a portable drywall roller device. The device has aframe with a horizontal plate and a horizontal groove across the plate for receiving the lower edge of the a drywall panel. The device has a pair of wheels with one wheel mounted on a rotatable caster mechanism on one side of the device and another wheel rotatably mounted on a horizontal axis extending across the device toward the caster wheel. A sleeve is fixed to the plate and extends upward therefrom. A rod is slidably mounted in the sleeve and has a pair of legs at its lower end which are adapted to engage the ground, one on each side of the horizontal axis extending across the device to provide a lateral ground support for the two wheels. The rod has a forward extending hook at its upper end for mounting over the top of the drywall panel when the bottom of the drywall panel is in the horizontal groove to lock the drywall panel to the device. The device may be rolled along the floor to transport the panel to different locations using the two wheels to move the device with the lateral legs providing a lateral side to side support.

3 Claims, 1 Drawing Sheet

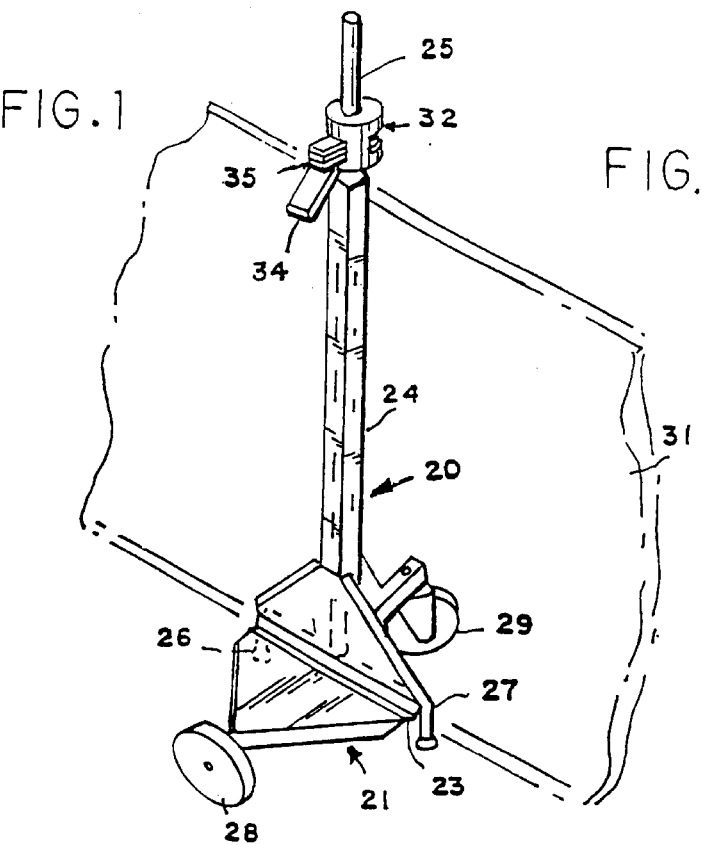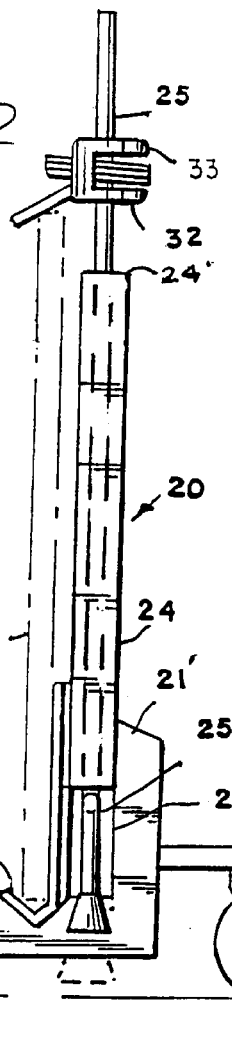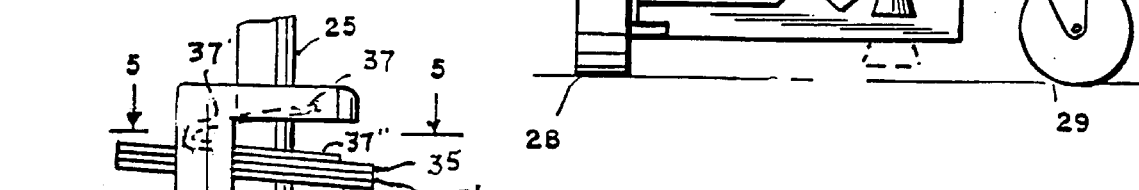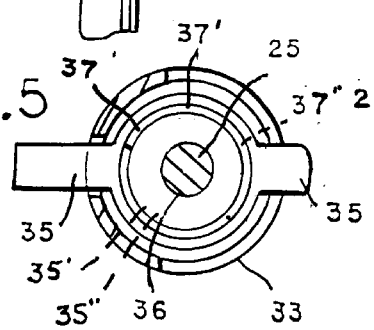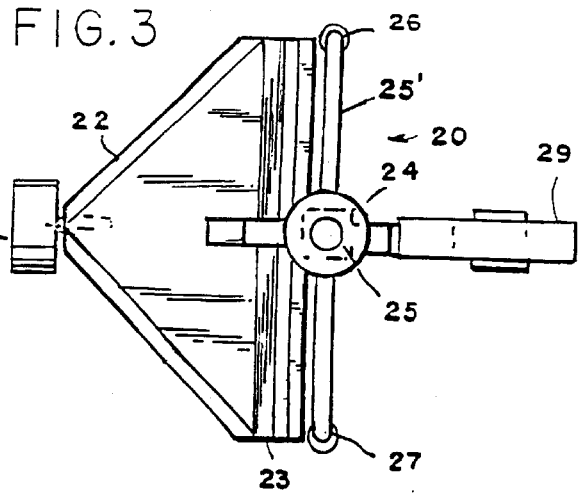

PANEL DEVICE

This invention relates to compact panel moving devices, more particularly, the invention relates to portable rolling frame apparatus for supporting and moving drywall panels and the like relatively short distances from place to place.

It is an object of the invention to provide a novel drywall panel moving device which can be easily, operated by one person to move a few drywall panels from one location on a work site to another location on the work site.

It is another object of the invention to provide a novel portable panel moving device which can grasp the upper and lower edges of the panel and be readily used to move the panel from place to place.

Further objects and advantages of the invention will become apparent as the description proceeds and when taken in conjunction with the accompanying drawing wherein:

BRIEF DESCRIPTION OF THE DRAWINGS

FIG. 1 is a perspective view of the portable drywall panel moving device illustrating a drywall panel mounted onto the device in phantom lines.

FIG. 2 is a side elevational view of the portable drywall panel moving device.

FIG. 3 is a top plan view of the portable drywall panel moving device.

FIG. 4 is an enlarged fragmentary side elevational view of the adjustable locking mechanism shown mounted on the sliding rod of the device.

FIG. 5 is an enlarged cross-sectional view taken along line 5—5 of FIG. 4.

This invention relates to portable drywall panel support. The rolling panel support has a horizontal plate with a V shaped horizontal groove extending along one side of the plate for receiving the bottom edge of a drywall panel therein. A caster wheel is mounted at one edge of the support and a rotating wheel mounted at the other end of the support and rotatable on a horizontal axis extending perpendicular toward the horizontal rotational axis of the caster wheel. A sliding vertical frame is slidable vertically on the main frame of the device and has a pair of horizontally spaced legs on each side of the path of the horizontal axis extending between the rotating wheel and caster wheel. The spaced legs extend downward and are adapted to be slid on their frame downward against the ground to provide a pair of ground supports laterally on each side of the first mentioned wheels so as to provide a support at ninety degree intervals about a vertical axis. The sliding frame support has an adjustable mechanism at its upper end adjustable vertically on the sliding support with a downward projecting flange on the mechanism so that the adjustable mechanism may be slid downward on the vertical frame to slid the flange over the top of a drywall panel when the bottom edge of the drywall panel is in the horizontal groove of the horizontal plate to provide an upper edge support to the drywall panel while the groove provides a lower edge support for the panel on the device.

The laterally spaced legs in their lowermost position are slightly above the bottom edges of the spaced wheels of the device so that the device may be rolled on the ground using the wheels while the legs simply guard against the device tipping too far in either direction laterally from the wheels.

Referring more particularly to the drawings, in FIG. 1 the rolling portable panel support device 20 is illustrated having a horizontal frame 21 with a horizontal plate 22 mounted across an upper portion of the frame. The horizontal plate 22 has a horizontal groove 23 extending laterally across the top of the plate. A vertical sleeve 24 is fixed to the frame behind the plate 22 and extends vertically upward. A rod 25 is slidably mounted in the sleeve 24 and has a inverted U-shaped lateral rod 25' fixed intermediate its length to the bottom of rod 25. The inverted U-shaped rod 25' forms a pair of spaced downward extending legs 26 and 27 fixed at its outer end at positions laterally outward from each side of rod 25 and extending downward on each side of rod 25. A pair of wheels 28 and 29 are rotatably mounted on each end of the frame 21 of the device, with one wheel 28 being a caster wheel and rotatable mounted on a horizontal axis to the caster frame 30 and adapted to rotate about a vertical axis with the caster wheel frame rotatable mounting to the horizontal frame two different directions.

The wheel 28 is rotatably mounted to frame 21 to rotate about a horizontal axis extending horizontally across the plate 22 to the caster wheel 29. A drywall panel 31 is receivable at its bottom in the horizontal groove 23.

An adjustable locking mechanism 32 is mounted on the rod 25 and is slidably adjustable on the rod along the length of the rod to any selected height on the rod. The locking mechanism 32 has a housing 33 and a forward and downward projecting flange 34 serves as a hook to hold the top of drywall panels 31 on the device, as shown in phantom lines in FIGS. 1 and 2, by sliding the locking mechanism downward on the rod 25 until the flange 34 may engage the top of the drywall panel 31, while the bottom of the panel 31 is engaged or resting in the groove 23 of the device to hold the panel 31 in place on the deice. The mechanism 32 also acts to hold the legs 26 and 27 at the bottom of the rod above the ground as shown in FIG. 2, when it is desired to roll the device 20 on the wheels 28 and 29 along the ground or along a floor, with the drywall panel 31 mounted on the device in the slot 23 on the device.

Also, when it is desired to roll the device 20 along the ground without a drywall panel mounted on the device, the adjustable lock mechanism 32 may be slid down on the rod against the sleeve 24 with the rod slid upward sufficiently to position the bottom of the legs 26 and 27 further above the ground, when the adjustment mechanism is downwardly against the top 24' of the sleeve 24 for easier rolling of the device along the ground on the two wheels. This present the preferred form of the invention. Although a hook could be fixed to the top of the rod 25 to hold the top of the panel in place a mechanism would be necessary to also hold the legs above the ground when desired. This adjustable mechanism eliminates the need for a separate mechanism for holding the rod and legs above the ground.

The adjustable locking mechanism 32 is of a conventional type, although other suitable adjustable lock mechanisms may be used.

The adjustable lock mechanism 32 has a conventional set of three plates 35, 35', and 35" with a and with the plates 35, 35', and 35" each having a center hole 36 to slidably receive the rod 25. A coil spring 37 mounted about the rod 25 above the plates in the housing. The spring 37 is one continuous spring wire formed into a pair of generally concentric coils 37' and 37" with the coils preformed at an angle to one another as shown in FIG. 4, so that when the top coil 37' engages the underside of the top of the housing 33', the bottom coil 27" pivots the three plates into an angle relative to the vertical longitudinal axis of the rod 25. The center holes of the plate are small enough so that the inner edges about the center holes of the plates engage the rod outer surface when the plates are pivoted to an angle and the angular engagement acts lock the plates on the rod 25 at their adjusted position on the rod. To change their position on the rod, the operator must pivot the three plates into straight perpendicular relation to the rod 25 as the center holes of the plate are large enough so that their inner edges will slide freely on the rod when the plates are perpendicular.

Thus, when it is desired to change the position of the mechanism on the rod the operator will grasp and pivot the plates to a perpendicular position relative to the rod 25 so that plates the housing and hook or lug 34 may be slid up or down on the rod 25 to a selected height on the rod 25 and then release the plates so that the spring may pivot the plates to an angle relative to the rod to lock the mechanism at this height, which height may be to either engage against the top of the drywall panel 31 and hold the drywall panel in place on the device and hold the legs above the ground, or to engage against the top of the sleeve when the rod 25 is raised sufficiently to raise the legs above the ground and maintain the legs above the ground when rolling the device on its wheels along the ground without the panel.

Thus it will be seen that a novel device has been provided for easily and rapidly receiving and moving a drywall panel from one location to another on the ground or floor. While the device is primarily intended for use in transporting drywall from place to place, it might also be used to move or transport door panels or other types of panels or frames.

It will be obvious that various changes and departures may be made to the invention without departing from the spirit and scope thereof and accordingly, it is not intended that the invention be limited to that specifically described in the specification or as illustrated in the drawings but only as set forth in the appended claims wherein:

What is claimed is:

1. A portable drywall transporting device comprising a frame, a horizontal plate mounted across the top of the frame, with a horizontal groove extending laterally across the plate for receiving and supporting a drywall panel at its lower edge, a vertical sleeve mounted to the frame, a vertically elongated rod slidable upward and downward in said sleeve, said rod having an inverted U shaped rod member forming laterally spaced legs extending laterally across the vertical rod and downward to provide a lateral side to side support to the device from tilting, a pair of wheels mounted at opposite ends of the device longitudinally from the lateral legs to a provide a rolling support for rolling the device along the ground, wherein one of said wheels is a caster wheel, the other of said wheels is a non-swivelable wheel, and the vertical sleeve is mounted to the frame between said wheels.

2. A portable drywall transporting device according to claim 1, wherein said vertical rod has a vertically adjustable clamping member vertically adjustable on said vertical rod, said clamping member having a projecting flange for engagement over the top of the drywall panel when the drywall panel has its bottom edge resting in the horizontal groove of the horizontal plate of the device for transporting the device along the ground by rolling the device on at least one of its wheels, with said vertically adjustable member being slidable downward on said rod sufficiently to hold said legs of said rod above the ground for easier rolling of the device on at said at least one of said wheels.

3. A panel supporting device comprising a frame, a horizontal plate mounted on said frame having a horizontal groove extending laterally across the plate, a vertical sleeve mounted to the frame, a vertical sleeve mounted to the frame, a vertical elongated rod slidably mounted in the sleeve, said vertical rod having an upper and lower end, a inverted U shaped rod adjacent its lower end forming laterally spaced downward extending legs laterally across the frame to provide a lateral side to side support for the device against tilting, a pair of wheels at opposite ends longitudinally of the device longitudinally from the lateral legs to provide a rolling support for rolling the device along the ground, said plate having a groove adapted to receive the bottom edge of a panel, adjustable hook means on the vertical rod for engaging the top of the panel when the panel is resting with its bottom in said groove for transporting the panel on the device wherein one of said wheels is a caster wheel, the other of said wheels is a non-swivelable wheel, and the vertical sleeve is mounted to the frame between said wheels.

* * * * *